F. H. CRAFTS.
PULLEY.
No. 174,203. Patented Feb. 29, 1876.
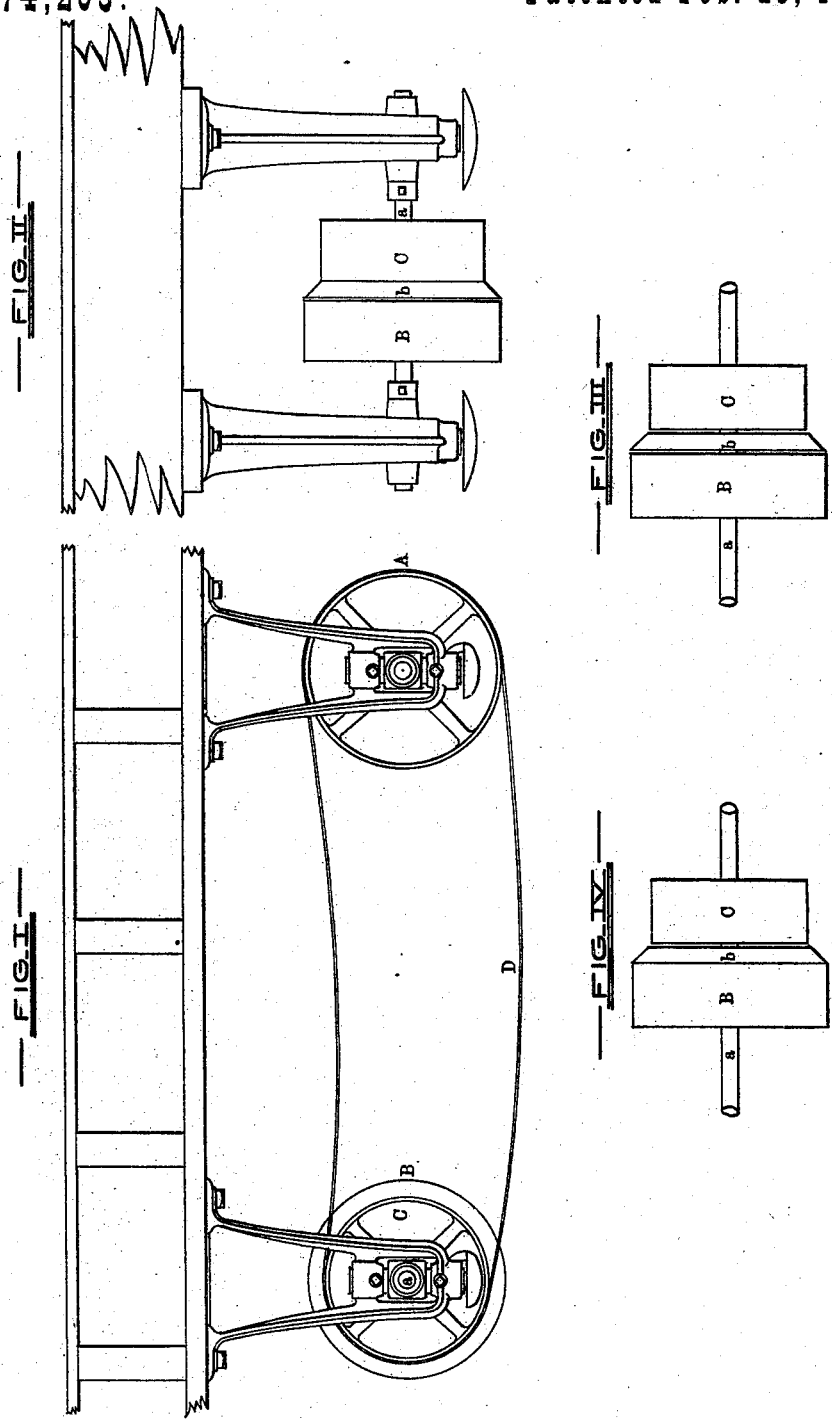

UNITED STATES PATENT OFFICE.

FRANCIS H. CRAFTS, OF WILLIAMSPORT, PENNSYLVANIA, ASSIGNOR OF ONE-HALF HIS RIGHT TO HENRY BEARD, OF SAME PLACE.

IMPROVEMENT IN PULLEYS.

Specification forming part of Letters Patent No. 174,203, dated February 29, 1876; application filed January 29, 1876.

*To all whom it may concern:*

Be it known that I, FRANCIS H. CRAFTS, of Williamsport, in the county of Lycoming and State of Pennsylvania, have invented certain new and useful Improvements in Pulleys, of which the following is a specification; and I do hereby declare that in the same is contained a full, clear, and exact description of my said invention, reference being had to the accompanying drawings and to the letters of reference marked thereon.

My invention relates to means, hereinafter fully described, whereby machine-belts are transferred from the tight or fixed pulley through which motion is given to machinery, or other useful work accomplished, to an adjacent pulley of smaller diameter running loosely upon, or independently of, the shaft to which the tight or fixed pulley is secured.

The object of my invention is to allow of the use of a loose pulley of such reduced diameter as to slacken the belt when running thereon, and thereby reduce the tension of the said belt, and, consequently, its wear, when not employed in the transmission of movement to machinery.

In the description of my invention which follows due reference must be had to the accompanying drawing, forming a part of this specification, and in which—

Figure 1 is a side view of a series of pulleys embodying my invention, the belt being represented as running on the loose pulley. Fig. 2 is an edge view of the invention, and Figs. 3 and 4 the invention modified in construction.

Similar letters of reference indicate similar part in all the figures.

A is the driving-pulley and B the tight pulley which transmits motion to the shaft $a$. C is a pulley of a diameter considerably less than that of the pulley B, running loosely upon the shaft $a$. The pulley B is provided with a conically-shaped flange, $b$, the outer diameter of which corresponds nearly to that of the pulley B. The driving-belt which connects the driving-pulley A with either the tight or loose pulley is represented by D. The belt is transferred to and from the loose pulley C by means of an ordinary shifter, the conical flange guiding the belt in its lateral movement. In Fig. 3 the conical flange is loose upon the shaft $a$, but not secured to the loose pulley C. In Fig. 4 the conical flange is secured to the tight pulley B.

Having thus described my invention, what I claim as new, and desire to secure by Letters Patent of the United States, is—

In combination with a tight and loose pulley situated upon the same shaft, the conical flange $b$, substantially as and for the purpose set forth.

FRANCIS H. CRAFTS.

Witnesses:
A. H. DEUEL,
NELSON RUNKER.